(12) United States Patent
Nakatani et al.

(10) Patent No.: US 12,344,749 B2
(45) Date of Patent: Jul. 1, 2025

(54) WATER-BASED COMPOSITION AND COLORING METHOD

(71) Applicant: Seiko Epson Corporation, Tokyo (JP)

(72) Inventors: Mitsunobu Nakatani, Shiojiri (JP); Kei Hiruma, Chino (JP); Tomoyuki Ushiyama, Chino (JP)

(73) Assignee: SEIKO EPSON CORPORATION (JP)

( * ) Notice: Subject to any disclaimer, the term of this patent is extended or adjusted under 35 U.S.C. 154(b) by 856 days.

(21) Appl. No.: 17/562,083

(22) Filed: Dec. 27, 2021

(65) Prior Publication Data

US 2022/0204785 A1 Jun. 30, 2022

(30) Foreign Application Priority Data

Dec. 28, 2020 (JP) ................................. 2020-218923

(51) Int. Cl.
| | |
|---|---|
| *C09D 11/037* | (2014.01) |
| *B41M 1/22* | (2006.01) |
| *C08G 65/08* | (2006.01) |
| *C08G 65/333* | (2006.01) |
| *C08K 3/08* | (2006.01) |
| *C08K 9/06* | (2006.01) |
| *C09D 11/102* | (2014.01) |
| *C09D 171/02* | (2006.01) |

(52) U.S. Cl.
CPC ............. *C09D 11/037* (2013.01); *B41M 1/22* (2013.01); *C08G 65/08* (2013.01); *C08G 65/33303* (2013.01); *C08K 3/08* (2013.01); *C08K 9/06* (2013.01); *C09D 11/102* (2013.01); *C09D 171/02* (2013.01); *C08K 2003/0812* (2013.01); *C08K 2201/003* (2013.01); *C08K 2201/011* (2013.01)

(58) Field of Classification Search
CPC combination set(s) only.
See application file for complete search history.

(56) References Cited

U.S. PATENT DOCUMENTS

| | | | |
|---|---|---|---|
| 2012/0295076 A1 | 11/2012 | Toyoda et al. | |
| 2012/0295082 A1 | 11/2012 | Toyoda et al. | |
| 2014/0035995 A1* | 2/2014 | Chou .................. | C09D 11/322 252/514 |
| 2015/0315397 A1* | 11/2015 | Toyoda ................ | B41J 2/04573 347/100 |
| 2022/0348773 A1 | 11/2022 | Sakai et al. | |

FOREIGN PATENT DOCUMENTS

| | | |
|---|---|---|
| JP | 2012-241061 A | 12/2012 |
| JP | 2012-255143 A | 12/2012 |
| JP | 2015-212018 A | 11/2015 |
| JP | 2021-161324 A | 10/2021 |
| JP | 7481341 B2 | 5/2024 |

* cited by examiner

*Primary Examiner* — Peter A Salamon
(74) *Attorney, Agent, or Firm* — Harness, Dickey & Pierce, P.L.C.

(57) ABSTRACT

A water-based composition of the present disclosure includes a metal pigment, a polyoxyalkylene amine compound, and a water-based medium, in which the metal pigment is formed of a plurality of metal particles, the metal particles are surface-modified by a surface treatment agent, and a content of the polyoxyalkylene amine compound is 0.1 parts by mass or more and 50 parts by mass or less with respect to 100 parts by mass of the metal particles.

12 Claims, No Drawings

WATER-BASED COMPOSITION AND COLORING METHOD

The present application is based on, and claims priority from JP Application Serial Number 2020-218923, filed Dec. 28, 2020, the disclosure of which is hereby incorporated by reference herein in its entirety.

BACKGROUND

1. Technical Field

The present disclosure relates to a water-based composition and a coloring method.

2. Related Art

In the related art, as methods for manufacturing decorative products with glossiness, metal plating, foil stamping printing using a metal foil, heat transfer using a metal foil, and the like have been used.

However, these methods had the problem of being difficult to be applied to curved surface portions.

On the other hand, compositions including pigments or dyes have been used as ink jet inks to be applied to recording media by an ink jet method or used as paints. Such a method is excellent in that such compositions are suitably applied in recording on curved surface portions.

In particular, in recent years, for the compositions described above, there is a demand for the use of water-based compositions in consideration of the environmental load, worker health, and the like.

However, when attempts are made to simply apply metal particles instead of pigments or dyes, there is a problem in that it is not possible to fully exhibit the characteristics such as glossiness inherent to metals.

With an object of solving the problem described above, it has been proposed to use metal particles surface-treated with a fluorine-based compound (refer to, for example, JP-A-2015-212018).

The dispersibility of the metal particles in the composition is improved to some extent as a result; however, the dispersion stability, the glossiness produced using the composition, and the like are insufficient. In particular, in water-based compositions, the problems described above are conspicuous, in addition, there is a problem in that the metal particles react with water and easily generate gas during storage or the like, that is, the water resistance is low. Accordingly, there is a demand to further improve the dispersion stability of the metal particles, the water resistance of the water-based composition, and the glossiness of the manufactured recorded material.

SUMMARY

The present disclosure can be realized in the following aspects or application examples.

A water-based composition according to an application example of the present disclosure includes a metal pigment, a polyoxyalkylene amine compound, and a water-based medium, in which the metal pigment is formed of a plurality of metal particles, the metal particles are surface-modified by a surface treatment agent, and a content of the polyoxyalkylene amine compound is 0.1 parts by mass or more and 50 parts by mass or less with respect to 100 parts by mass of the metal particles.

In addition, in the water-based composition of another application example of the present disclosure, the polyoxyalkylene amine compound is at least one of a compound represented by Formula (1) and a salt thereof.

(In Formula (1), $R^1$ is a hydrogen atom or an alkyl group having four or fewer carbon atoms, $R^2$ is an alkylene group having five or fewer carbon atoms, and X is an integer of 10 or more. In addition, in Formula (1), a plurality of oxyalkylene units with different conditions of $R^2$ may be provided. Y is an integer of 1 to 3. When Y is two or more, $(R^1-(O-R^2)_X)$ units with different conditions of $R^1$, $R^2$, and X may be included.)

In addition, in the water-based composition of another application example of the present disclosure, the polyoxyalkylene amine compound is at least one of a compound represented by Formula (2) and a salt thereof.

(In Formula (2), $R^1$ is a hydrogen atom or an alkyl group having four or fewer carbon atoms, $R^2$ is a hydrogen atom or an alkyl group having three or fewer carbon atoms, and X is an integer of 10 or more. In addition, in Formula (2), a plurality of oxyalkylene units with different conditions of R may be provided.)

In addition, in the water-based composition of another application example of the present disclosure, the metal particles are formed of aluminum or an aluminum alloy.

In addition, in the water-based composition of another application example of the present disclosure, a volume average particle diameter of the metal particles is 0.20 μm or more and 1.00 μm or less.

In addition, in the water-based composition of another application example of the present disclosure, the metal particles are scale-shaped.

In addition, in the water-based composition of another application example of the present disclosure, an average thickness of the metal particles is 10 nm or more and 90 nm or less.

In addition, in the water-based composition of another application example of the present disclosure, the surface treatment agent includes at least one of a hydrophobic phosphorous-based surface treatment agent and a silicon-based surface treatment agent.

In addition, in the water-based composition of another application example of the present disclosure, a weight average molecular weight of the polyoxyalkylene amine compound is 400 or more and 8000 or less.

In addition, in the water-based composition of another application example of the present disclosure, the content of the polyoxyalkylene amine compound is 0.1 parts by mass or more and 30 parts by mass or less with respect to 100 parts by mass of the metal particles.

In addition, the water-based composition of another application example of the present disclosure is a composition for coloring, or a composition for use in preparing a composition for coloring.

In addition, a coloring method according to an application example of the present disclosure includes attaching the water-based composition according to the application examples of the present disclosure, which is a composition for coloring, to an object to be colored.

DESCRIPTION OF EXEMPLARY EMBODIMENTS

A detailed description of embodiments of the present disclosure will be given below.

1 Water-Based Composition

First, the water-based composition of the present disclosure is described.

Here, in the related art, as methods for manufacturing decorative products with glossiness, metal plating, foil stamping printing using a metal foil, heat transfer using a metal foil, and the like have been used.

However, these methods had the problem of being difficult to be applied to curved surface portions.

On the other hand, compositions including pigments or dyes have been used as ink jet inks to be applied to recording media by an ink jet method or used as paints. Such a method is excellent in that such compositions are suitably applied in recording on curved surface portions.

In particular, in recent years, for the compositions described above, there is a demand for the use of water-based compositions in consideration of the environmental load, worker health, and the like.

However, when attempts are made to simply apply metal particles instead of pigments or dyes, there is a problem in that it is not possible to fully exhibit the characteristics such as glossiness inherent to metals.

With an object of solving the problem described above, it has been proposed to use metal particles surface-treated with a fluorine-based compound. The dispersibility of the metal particles in the composition is improved to some extent as a result; however, the dispersion stability, the glossiness manufactured using the composition and the like are insufficient. In particular, in water-based compositions, the problems described above are conspicuous, in addition, there is a problem in that the metal particles react with water and easily generate gas during storage or the like, that is, the water resistance is low. Accordingly, there is a demand to further improve the dispersion stability of the metal particles, the water resistance of the water-based composition, and the glossiness of the manufactured recorded material.

Therefore, the inventors conducted intensive research for the purpose of solving the problems described above, resulting in the present disclosure. That is, the water-based composition of the present disclosure contains a metal pigment, a polyoxyalkylene amine compound, and a water-based medium, in which the metal pigment is formed of a plurality of metal particles, the metal particles are surface-modified by a surface treatment agent, and a content of the polyoxyalkylene amine compound is 0.1 parts by mass or more and 50 parts by mass or less with respect to 100 parts by mass of the metal particles.

Due to this, it is possible to provide a water-based composition having excellent dispersion stability of the metal particles and water resistance and being able to be suitably applied to the manufacturing of a recorded material having excellent glossiness. In particular, even when the water-based composition is stored for a long period of time or stored under severe conditions, it is possible for the dispersion stability of the metal particles in the water-based composition, the glossiness of the recorded material manufactured using the water-based composition, and the like to be excellent.

In addition, when the water-based composition is an ink jet composition applied to ejection by an ink jet method, in addition to the effects described above, it is possible to obtain the benefits of applying the ink jet method, such as being able to more suitably form fine patterns, having excellent on-demand properties, and the like. In addition, it is possible to achieve excellent droplet ejection stability and the like in a relatively short period of time after the ink jet composition is manufactured and also to achieve excellent droplet ejection stability and the like even when the ink jet composition is stored for a long period of time or stored under severe conditions.

It is considered that the obtaining of this excellent effect is due to the following reasons.

That is, it is possible for the polyoxyalkylene amine compound to achieve excellent dispersion stability of the metal particles in the water-based composition by interacting with the surface treatment agent which modifies the surface of the metal pigment and also to prevent the aggregation of the metal pigment and sufficiently advance the surface treatment of the metal pigment by the surface treatment agent by loosening the metal pigment.

In contrast, when the conditions described above are not satisfied, it is not possible to obtain satisfactory results.

For example, when the water-based composition does not include a polyoxyalkylene amine compound, the following problems occur. That is, for example, even when the metal pigment is surface-modified with a surface treatment agent, when the polyoxyalkylene amine compound is not included, even if it is possible to make the dispersion stability and the like of the metal particles in the water-based composition excellent in the short term, it is not possible to maintain the dispersion state of the metal particles in the water-based composition in a good state when the water-based composition is stored for a long period of time or stored under severe conditions. As a result, the glossiness of the recorded material manufactured using the water-based composition is significantly reduced. In particular, even when the metal pigment is surface-modified with a surface treatment agent, in a case where the polyoxyalkylene amine compound is not included, the surface-modified metal particles become hydrophobic with low surface free energy and it is considered that aggregation of the metal particles due to hydrophobic interaction is more likely to occur. Alternatively, in a case where the polyoxyalkylene amine compound is not included when the metal pigment is surface-modified with the surface treatment agent, it is considered that, when the metal particles are treated with a fluorine-based compound, the metal particles will aggregate and not be sufficiently treated with the surface treatment agent.

In addition, even when the water-based composition includes a polyoxyalkylene amine compound, when the content of the polyoxyalkylene amine compound is less than the lower limit value described above, the following problems occur. That is, the effect of including the polyoxyalkylene amine compound as described above is not sufficiently exhibited. As a result, when the water-based composition is stored for a long period of time or stored under severe conditions, the dispersion state of the metal particles in the water-based composition is degraded and it is not possible to obtain satisfactory glossiness in the manufactured recorded material.

In addition, even when the water-based composition includes a polyoxyalkylene amine compound, when the content of the polyoxyalkylene amine compound exceeds the upper limit value described above, the initial gloss value of the recorded material is reduced and, furthermore, the storage stability is also reduced when the water-based composition is stored for a long period of time or stored under severe conditions. In addition, the water resistance of the water-based composition also decreases.

The content of the polyoxyalkylene amine compound in the water-based composition may be 0.1 parts by mass or more and 50 parts by mass or less with respect to 100 parts by mass of the metal particles and it is preferable to satisfy the following conditions. That is, the lower limit of the content of the polyoxyalkylene amine compound with respect to 100 parts by mass of metal particles is preferably 0.5 parts by mass, more preferably 1.0 part by mass, and even more preferably 2.0 parts by mass. In addition, the upper limit of the content of the polyoxyalkylene amine compound with respect to 100 parts by mass of metal particles is preferably 40 parts by mass, more preferably 30 parts by mass, and even more preferably 10 parts by mass.

Due to this, the effects described above are exhibited more conspicuously.

The constituent components of the water-based composition of the present disclosure are described below.

1-1 Metal Pigment

The water-based composition of the present disclosure includes a metal pigment formed of a plurality of metal particles.

The metal particles forming the metal pigment are surface-modified by a surface treatment agent to be described in detail below.

The metal particles are particles in which at least a portion of the part which is visible as the appearance is formed of a metal material, in which the vicinity of the outer surface is usually formed of the metal material.

The metal particles are a component which has a significant effect on the appearance of the recorded material manufactured using the water-based composition.

In the water-based composition of the present disclosure, the metal particles are usually presumed to have a polyoxyalkylene amine compound, described in detail below, attached to the surfaces thereof.

The metal particles may be particles in which at least a region including the vicinity of the surface is formed of a metal material, for example, the metal particles may be particles formed entirely of a metal material, or may be particles having a base portion formed of a non-metal material and a film formed of a metal material covering the base portion. In addition, the metal particles may also have an oxide film, such as a passive state film, or the like formed on the surface thereof. Even with such metal particles, the problems described above occurred in the related art while the application of the present disclosure obtains the excellent effects described above.

As the metal material forming the metal particles, it is possible to use a metal as a single unit, various alloys, or the like. Examples thereof include aluminum, silver, gold, platinum, nickel, chromium, tin, zinc, indium, titanium, iron, copper, and the like. Among the above, the metal particles are preferably formed of aluminum or aluminum alloys. Examples of the reasons aluminum and aluminum alloys are preferable include having a lower specific gravity than iron and the like. Due to this, settling proceeds extremely slowly when the particles formed of aluminum or aluminum alloy are dispersed in the water-based composition, thus, it is possible to store the water-based composition for a longer period of time while effectively preventing the generation of uneven concentration and the like.

Additionally, it is possible to obtain a particularly excellent glossiness and luxurious appearance of the recorded material while suppressing an increase in the production cost of the recorded material. Although aluminum and aluminum alloys inherently exhibit a particularly excellent glossiness among various metal materials, the present inventors found that the following problems occur when particles formed of these materials are applied to a water-based composition. That is, the present inventors found that the storage stability of the water-based composition is particularly low, and, in particular, when such a water-based composition is used as an ink jet composition, problems such as decreased ejection stability due to increased viscosity caused by gelation are particularly likely to occur. On the other hand, including a polyoxyalkylene amine compound in a predetermined proportion along with the metal pigment makes it possible to reliably prevent the occurrence of the above problems even when particles formed of aluminum or an aluminum alloy are used. That is, the effect of the present disclosure is more conspicuous when the metal particles are formed of aluminum or an aluminum alloy.

The metal particles may be of any shape, such as spherical, spindle-shaped, needle-shaped, and the like, but are preferably scale-shaped.

Due to this, it is possible to arrange the main surface of the metal particles on the recording medium on which the water-based composition is applied so as to follow the surface shape of the recording medium. As a result, it is possible to more effectively exhibit the glossiness and the like inherent in the metal materials forming the metal particles in the obtained recorded material, to make the glossiness and luxurious appearance of the printed portion to be formed particularly excellent, and to make the abrasion resistance of the recorded material particularly excellent. In addition, in a water-based composition which does not include a polyoxyalkylene amine compound, when the metal particles are scale-shaped, the storage stability of the water-based composition is likely to be particularly low, and when the water-based composition is used as an ink jet composition, the ejection stability of the ink jet composition is likely to be particularly low. In addition, it is not possible to express an excellent glossiness or the like through scale-shaped metal particles.

On the other hand, when the water-based composition includes a polyoxyalkylene amine compound in a predetermined proportion together with the metal particles, it is possible to reliably prevent the occurrence of the problems described above even when the metal particles are scale-shaped. In other words, the effect of the present disclosure is more conspicuous when the metal particles are scale-shaped.

In the present disclosure, "scale-shaped" refers to a shape, such as a planar plate or a curved plate, in which the area when observed from a predetermined angle, for example, when observed in plan view, is larger than the area when observed from an angle orthogonal to the direction of observation. In particular, a ratio $S_1/S_0$ of an area $S_1$ [$\mu m^2$] when observed from the direction in which the projected area is the largest, that is, in plan view, and an area $S_0$ [$\mu m^2$] when observed from the direction in which the area is the largest when observed in a direction orthogonal to the former observation direction is preferably 2 or more, more preferably 5 or more, and even more preferably 8 or more. Furthermore, 10 or more is preferable, and 20 or more is more preferable. The upper limit is not limited and 1000 or less is preferable, 500 or less is more preferable, and 100 or less is even more preferable. As this value, for example, it is possible to observe any 50 particles and use the average value of the values calculated for these particles. It is possible to perform the observation, for example, using an electron microscope, an atomic force microscope, or the like.

Alternatively, a volume average particle diameter (D50), which will be described below, and the average thickness are used and these units are put together to obtain the volume average particle diameter (D50)/average thickness, which may be used as the range described above.

When the metal particles are scale-shaped, the lower limit of the average thickness of the metal particles is not particularly limited and 10 nm is preferable, and 15 nm is more preferable. In addition, when the metal particles are scale-shaped, the upper limit of the average thickness of the metal particles is not particularly limited and 90 nm is preferable, 70 nm is more preferable, 50 nm is even more preferable, and 30 nm is most preferable.

Due to this, the effect due to the particles being scale-shaped as described above is exhibited more conspicuously.

The lower limit of the volume average particle diameter of the metal particles is not particularly limited and is preferably 0.20 μm, more preferably 0.25 μm, and even more preferably 0.30 μm. The upper limit of the volume average particle diameter of the metal particles is not particularly limited and is preferably 1.00 μm, more preferably 0.90 μm, and even more preferably 0.80 μm.

Due to this, it is possible to more effectively prevent the generation of unwanted color irregularities or the like in the recorded material manufactured using the water-based composition while obtaining superior storage stability, water resistance, and the like of the water-based composition.

In the present disclosure, the volume average particle diameter refers to the median diameter of a volume distribution of the particle dispersion liquid measured using a laser diffraction/scattering method and, when the measurement results of many particles are expressed as an accumulation of the abundance ratio for each size, is the size of the particle exhibiting exactly 50% of the median value in the accumulation. When the metal particles are scale-shaped, the volume average particle diameter is determined based on the shape and size of the metal particles when converted to spherical form.

In addition, the upper limit of a particle diameter D90 at 90% of the volume cumulative distribution ratio from the fine particle side of the metal particles included in the water-based composition is preferably 1.50 μm, more preferably 1.20 μm, and even more preferably 0.95 μm.

Due to this, it is possible to more effectively prevent the generation of unwanted color irregularities or the like in the recorded material manufactured using the water-based composition while obtaining superior storage stability, water resistance, and the like of the water-based composition.

The lower limit of the content ratio of the metal particles in the water-based composition is not particularly limited and is preferably 0.1% by mass, more preferably 0.2% by mass, and even more preferably 0.3% by mass. In addition, the upper limit of the content ratio of the metal particles in the water-based composition is not particularly limited and is preferably 30% by mass, more preferably 20% by mass, even more preferably 15% by mass, and most preferably 10% by mass.

Due to this, it is possible to make the glossiness of the printed portion formed using the water-based composition particularly excellent, while having superior storage stability, water resistance, and the like of the water-based composition.

In particular, when the water-based composition is the ink itself or the like to be ejected by the ink jet method, the lower limit of the content ratio of the metal particles in the ink is not particularly limited and is preferably 0.1% by mass, more preferably 0.2% by mass, and even more preferably 0.3% by mass. In addition, when the water-based composition is the ink itself to be ejected by the ink jet method, the upper limit of the content ratio of the metal particles in the ink is not particularly limited and is preferably 2.4% by mass, more preferably 2.2% by mass, and even more preferably 1.8% by mass.

In addition, when the water-based composition is a stock solution used for preparing an ink to be ejected by an ink jet method or a paint, the lower limit of the content ratio of the metal particles in the water-based composition is not particularly limited and 2.0% by mass is preferable, 2.5% by mass is more preferable, and 3.0% by mass is even more preferable. In addition, when the water-based composition is a stock solution used for preparing an ink to be ejected by an ink jet method or a paint, the upper limit of the content ratio of the metal particles in the water-based composition is not particularly limited and is preferably 30% by mass, more preferably 20% by mass, even more preferably 15% by mass, and most preferably 10% by mass.

The metal particles may be manufactured by any method, but when the metal particles are formed of Al, the metal particles are preferably obtained by forming a film formed of Al by a vapor phase deposition method and then pulverizing the film. Due to this, it is possible to more effectively express the inherent glossiness and the like of Al in the printed portion formed using the water-based composition of the present disclosure. In addition, it is possible to suppress the variation of characteristics among the respective particles. In addition, using this method makes it possible to suitably manufacture even relatively thin metal particles.

When metal particles are manufactured using such a method, for example, it is possible to suitably manufacture metal particles by forming a film formed of Al on a base material. For example, it is possible to use a plastic film such as polyethylene terephthalate or the like as the base material. In addition, the base material may also have a release agent layer on the film-forming surface.

In addition, the pulverizing is preferably performed by applying ultrasonic vibration to the film in a liquid. Due to this, it is possible to easily and reliably obtain metal particles of the particle diameter as described below and to suppress the generation of variations in size, shape, and characteristics among the respective metal particles.

In addition, when pulverizing is performed with the method described above, as the liquid described above, it is possible to suitably use alcohols, hydrocarbon-based compounds, ether-based compounds, and polar compounds such as propylene carbonate, γ-butyrolactone, N-methyl-2-pyrrolidone, N,N-dimethylformamide, N,N-dimethylacetamide, dimethyl sulfoxide, cyclohexanone, and acetonitrile. By using such a liquid, the productivity of the metal particles is particularly excellent while preventing unwanted oxidation and the like of the metal particles and it is also possible to particularly reduce variations in size, shape, and characteristics among the respective particles.

Examples of the alcohols include methanol, ethanol, propanol, butanol, and the like. In addition, examples of the hydrocarbon-based compounds include n-heptane, n-octane, decane, dodecane, tetradecane, toluene, xylene, cymene, durene, indene, dipentene, tetrahydronaphthalene, decahydronaphthalene, cyclohexylbenzene, and the like. In addition, examples of the ether-based compounds include ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, diethylene glycol monobutyl ether acetate, diethylene glycol n-butyl ether, tripropylene glycol dimethyl ether, triethylene glycol diethyl ether, 1,2-dimethoxyethane, bis(2-methoxyethyl) ether, p-dioxane, tetrahydrofuran, and the like.

1-2 Polyoxyalkylene Amine Compound

The water-based composition of the present disclosure contains a polyoxyalkylene amine compound.

The polyoxyalkylene amine compound may be any amine compound having a polyoxyalkylene structure in the molecule, but is preferably at least one of a compound represented by Formula (1) and a salt thereof.

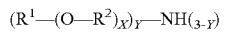
(1)

(In Formula (1), $R^1$ is a hydrogen atom or an alkyl group having four or fewer carbon atoms, $R^2$ is an alkylene group having five or fewer carbon atoms, and X is an integer of 10 or more. In addition, in Formula (1), a plurality of oxyalkylene units with different conditions of $R^2$ may be provided. Y is an integer of 1 to 3. When Y is two or more, $(R^1$—$(O$—$R^2)_X)$ units with different conditions of $R^1$, $R^2$, and X may be included.)

Due to this, it is possible to make the storage stability, water resistance, and the like of the water-based composition superior and to make the glossiness of the recorded material manufactured using the water-based composition superior when the water-based composition is stored for a long period of time or stored under severe conditions. In addition, when the water-based composition is an ink jet composition, it is possible to make the ejection stability of the ink jet composition superior, in particular, the ejection stability of the ink jet composition when being stored for a long period of time or being stored under severe conditions superior.

As described above, the polyoxyalkylene amine compound is preferably at least one of a compound represented by Formula (1) and a salt thereof.

Among the compounds represented by Formula (1), Y is preferably 1. $R^1$ is preferably an alkyl group having 4 or fewer carbon atoms among the above, and an alkyl group having 1 or 2 carbon atoms is more preferable. $R^2$ preferably has 1 to 3 carbon atoms and may be a linear alkylene group or a branched alkylene group.

Among the compounds represented by Formula (1), in particular, at least one of a compound represented by Formula (2) and a salt thereof is more preferable

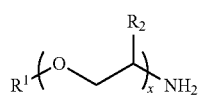
(2)

(In Formula (2), $R^1$ is a hydrogen atom or an alkyl group having four or fewer carbon atoms, $R^2$ is a hydrogen atom or an alkyl group having three or fewer carbon atoms, and X is an integer of 10 or more. In addition, in Formula (2), a plurality of oxyalkylene units with different conditions of R may be provided.)

Due to this, it is possible to make the storage stability, water resistance, and the like of the water-based composition superior and to make the glossiness of the recorded material manufactured using the water-based composition superior when the water-based composition is stored for a long period of time or stored under severe conditions. In addition, when the water-based composition is an ink jet composition, it is possible to make the ejection stability of the ink jet composition superior, in particular, the ejection stability of ink jet composition when being stored for a long period of time or being stored under severe conditions superior.

$R^1$ in Formula (1) and Formula (2) may be a hydrogen atom or an alkyl group having four or fewer carbon atoms, but an alkyl group having four or fewer carbon atoms is preferable, and a methyl group is more preferable.

Due to this, it is possible to make the storage stability, water resistance, and the like of the water-based composition superior and to make the glossiness of the recorded material manufactured using the water-based composition superior when the water-based composition is stored for a long period of time or stored under severe conditions. In addition, when the water-based composition is an ink jet composition, it is possible to make the ejection stability of the ink jet composition superior, in particular, the ejection stability of the ink jet composition when being stored for a long period of time or being stored under severe conditions superior.

$R^2$ in Formula (2) may be a hydrogen atom or an alkyl group having three or fewer carbon atoms, but is preferably a hydrogen atom or a methyl group, and is more preferably the compound represented by Formula (3).

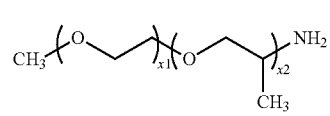
(3)

(In Formula (3), x1 and x2 are independently integers of 1 or more, and x1+x2 is an integer of 10 or more. In addition, in Formula (3), the order of the oxyethylene unit and the oxypropylene unit does not matter.)

Due to this, it is possible to make the storage stability, water resistance, and the like of the water-based composition superior and to make the glossiness of the recorded material manufactured using the water-based composition superior when the water-based composition is stored for a long period of time or stored under severe conditions. In addition, when the water-based composition is an ink jet composition, it is possible to make the ejection stability of the ink jet composition superior, in particular, the ejection stability of the ink jet composition when being stored for a long period of time or being stored under severe conditions superior.

In addition, the lower limit of the value of x1/x2, which is the ratio of x1 with respect to x2 in Formula (3), that is, the ratio of the amount of material of the oxyethylene unit with respect to the amount of material of the oxypropylene unit in the molecule of the polyoxyalkylene amine compound, is preferably 0.05, more preferably 0.15, and even more preferably 0.70. In addition, the upper limit of the value of x1/x2 is preferably 10.00, more preferably 8.00, and even more preferably 6.00.

Due to this, it is possible to make the storage stability, water resistance, and the like of the water-based composition superior and to make the glossiness of the recorded material manufactured using the water-based composition superior when the water-based composition is stored for a long period of time or stored under severe conditions. In addition, when the water-based composition is an ink jet composition, it is possible to make the ejection stability of the ink jet composition superior, in particular, the ejection stability of the ink jet composition when being stored for a long period of time or being stored under severe conditions superior.

As described above, the order of the oxyethylene unit and the oxypropylene unit in Formula (3) does not matter. More specifically, in Formula (3), an amino group is bonded to the terminal of a continuous oxyethylene unit and a methyl group is bonded to the terminal of a continuous oxypropylene unit, but an amino group may be bonded to the terminal of a continuous oxypropylene unit and a methyl group may be bonded to the terminal of a continuous oxyethylene unit. In addition, the compound represented by Formula (3) may be a block copolymer or may be a random copolymer.

In Formula (1) or Formula (2), when the oxyalkylene unit has an oxypropylene unit and an oxyethylene unit, preferably, the same applies as above with respect to the oxypropylene unit and the oxyethylene unit, for example, the range described above preferably applies with respect to the ratio of the oxypropylene unit to the oxyethylene unit.

The lower limit of the weight average molecular weight of the polyoxyalkylene amine compound is not particularly limited and is preferably 400, more preferably 500, even more preferably 800, and most preferably 1000. In addition, the upper limit of the weight average molecular weight of the polyoxyalkylene amine compound is not particularly limited and is preferably 8000, more preferably 5000, and even more preferably 3000.

Due to this, it is possible to make the storage stability, water resistance, and the like of the water-based composition superior and to make the glossiness of the recorded material manufactured using the water-based composition superior when the water-based composition is stored for a long period of time or stored under severe conditions. In addition, when the water-based composition is an ink jet composition, it is possible to make the ejection stability of the ink jet composition superior, in particular, the ejection stability of the ink jet composition when being stored for a long period of time or being stored under severe conditions superior.

The water-based composition of the present disclosure may include a plurality of compounds as polyoxyalkylene amine compounds.

The lower limit of the content ratio of the polyoxyalkylene amine compound in the water-based composition is not particularly limited and is preferably 0.01% by mass, more preferably 0.02% by mass, and even more preferably 0.03% by mass. In addition, the upper limit of the content ratio of the polyoxyalkylene amine compound in the water-based composition is not particularly limited and is preferably 3.0% by mass, more preferably 2.0% by mass, and even more preferably 1.5% by mass.

Due to this, it is possible to make the storage stability, water resistance, and the like of the water-based composition superior and to make the glossiness of the recorded material manufactured using the water-based composition superior when the water-based composition is stored for a long period of time or stored under severe conditions. In addition, when the water-based composition is an ink jet composition, it is possible to make the ejection stability of the ink jet composition superior, in particular, the ejection stability of the ink jet composition when being stored for a long period of time or being stored under severe conditions superior.

In particular, when the water-based composition is the ink itself to be ejected by the ink jet method, the lower limit of the content ratio of the polyoxyalkylene amine compound in said ink is not particularly limited and 0.01% by mass is preferable, 0.02% by mass is more preferable, and 0.03% by mass is even more preferable. In addition, when the water-based composition is the ink itself to be ejected by the ink jet method, the upper limit of the content ratio of the polyoxyalkylene amine compound in the ink is not particularly limited and is preferably 1.0% by mass, more preferably 0.70% by mass, and even more preferably 0.50% by mass.

In addition, when the water-based composition is a stock solution used for preparing an ink to be ejected by an ink jet method or a paint, the lower limit of content ratio of the polyoxyalkylene amine compound in the water-based composition is not particularly limited and is preferably 0.05% by mass, more preferably 0.10% by mass, and even more preferably 0.20% by mass. In addition, when the water-based composition is a stock solution used for preparing an ink to be ejected by an ink jet method or a paint, the upper limit of the content ratio of the polyoxyalkylene amine compound in the water-based composition is not particularly limited and 3.0% by mass is preferable, 2.0% by mass is more preferable, and 1.5% by mass is even more preferable.

The content of the polyoxyalkylene amine compound in the water-based composition is preferably 0.1 parts by mass or more and 30 parts by mass or less with respect to 100 parts by mass of the metal particles, more preferably 0.5 parts by mass or more and 20 parts by mass or less, and even more preferably 1.0 part by mass or more and 10 parts by mass or less.

Due to this, it is possible to make the storage stability, water resistance, and the like of the water-based composition superior and to make the glossiness of the recorded material manufactured using the water-based composition superior when the water-based composition is stored for a long period of time or stored under severe conditions. In addition, when the water-based composition is an ink jet composition, it is possible to make the ejection stability of the ink jet composition superior, in particular, the ejection stability of the ink jet composition when being stored for a long period of time or being stored under severe conditions superior.

1-3 Water-Based Medium

The water-based composition of the present disclosure contains a water-based medium.

The water-based medium has at least water as the main component and may also include liquid components which exhibit solubility with respect to water. The water-based medium mixes favorably with water in the composition.

In the water-based composition of the present disclosure, the water-based medium functions mainly as a dispersing medium to disperse the metal particles.

In addition, the water-based composition including a water-based medium makes it possible to eject the ink by an ink jet method when the water-based composition is the ink itself to be ejected by the ink jet method. In addition, it is possible to improve the moisture retention property of the ink and to more effectively prevent the unwanted precipitation of the solid content of the ink due to drying or the like in the ink jet head or the like. In addition, it is possible to more suitably adjust the viscosity of the ink.

A liquid component which exhibits solubility with respect to water is, in other words, a water-soluble liquid component and examples thereof include water-soluble organic solvents and the like. For example, it is possible to suitably use a liquid component having a solubility in water of 2 g/100 g water or more at 25° C. The water-based medium may be water itself. In such a case, the solubility of the water-based medium in water is infinite.

The content of water in the water-based medium is preferably 30% by mass or more, more preferably 40% by mass or more, even more preferably 50% by mass or more, and particularly preferably 55% by mass or more. The content of water in the water-based medium is 100% by mass or less.

In addition, the content of water in the water-based composition may be in the range described above.

The water-based medium preferably includes, in addition to water, a water-soluble organic solvent in which the solubility in water at 25° C. is 100 g/100 g water or more. In such a case, the boiling point of the water-soluble organic solvent at 1 atm is preferably 110° C. or higher and 300° C. or lower.

Due to this, it is possible to further improve the moisture retention property of the water-based composition, for example, to more effectively prevent unwanted precipitation of the solid content of the ink jet composition as a water-based composition due to drying or the like in the ink jet head or the like. As a result, it is possible to make the ejection stability of the water-based composition by the ink jet method superior. In addition, after the water-based composition is ejected, it is possible to carry out volatilization relatively easily when necessary and to more effectively prevent unwanted water-based medium from remaining in the manufactured recorded material.

Examples of such water-soluble organic solvents include alkyl monoalcohols; glycerin; glycols; glycol monoethers; lactams; alcohols, and the like and it is possible to use one or two or more selected from the above in combination.

Examples of glycols include triethanolamine; ethylene glycol, diethylene glycol, triethylene glycol, propylene glycol, 1,2-hexanediol, and the like. In addition, examples of glycol monoethers include triethylene glycol monobutyl ether and the like. In addition, examples of lactams include 2-pyrrolidone and the like.

Alcohols are not limited and examples thereof include ethanol, methanol, propanol, butanol, phenoxyethanol, and the like.

The lower limit of the content ratio of the water-based medium in the water-based composition is not particularly limited and 30% by mass is preferable, 40% by mass is more preferable, and 50% by mass is even more preferable. Furthermore, 60.0% by mass is preferable, 70.0% by mass is more preferable, and 75.0% by mass is even more preferable. In addition, the upper limit of the content ratio of the water-based medium in the water-based composition is not particularly limited and is preferably 99.7% by mass, more preferably 99.5% by mass, and even more preferably 99.0% by mass.

Due to this, it is possible to make the viscosity of the water-based composition more suitable.

In addition, when the content ratio of water in the water-based composition is XW [% by mass] and the content ratio of the water-soluble organic solvent in the water-based composition is XH [% by mass], XH/XW is preferably 0.15 or more and 1.20 or less, more preferably 0.20 or more and 0.90 or less, and even more preferably 0.30 or more and 0.60 or less.

Due to this, it is possible to more suitably improve the moisture retention property of the water-based composition while the viscosity of the water-based composition is more suitable.

1-4 Surface Treatment Agent

The metal particles described above are surface modified by a surface treatment agent.

The surface treatment agent may be any agent which surface modifies the metal particles, but it is preferable to include at least one of a hydrophobic phosphorous-based surface treatment agent and a silicon-based surface treatment agent.

Due to this, it is possible to make the dispersion stability, water resistance, and the like of the metal particles in the ink jet composition superior.

The hydrophobic phosphorus-based surface treatment agent may be a phosphorus-based surface treatment agent that, in a state of being attached to the metal particles, has the function of increasing the hydrophobicity of the metal particles compared to the metal particles to which the hydrophobic phosphorus-based surface treatment agent is not attached. The phosphorus-based surface treatment agent of the hydrophobic phosphorus-based surface treatment agent may be any phosphorus-based compound which contains phosphorus atoms, for example, it is possible to use phosphoric acid derivatives, phosphoric acid derivatives, phosphinic acid derivatives, and the like. Examples of derivatives include tautomers, esterides, etherides, derivatives in which hydrogen atoms in the structural formula are replaced by organic substituent groups, and the like. It is also possible to use surface treatment agents which are used as surfactants or the like for these hydrophobic phosphorus-based surface treatment agents. The hydrophobic phosphorus-based surface treatment agents preferably have hydrophobic atoms or atomic groups.

Examples of the hydrophobic atoms or atomic groups include a fluorine atom, an alkyl group having three or more carbon atoms, an alkyl group in which at least a portion of the hydrogen atom is substituted with a fluorine atom, and the like. The number of carbon atoms of the alkyl group, or the alkyl group or the like in which at least a portion of the hydrogen atom is substituted with a fluorine atom, is preferably 3 or more, more preferably 5 or more, and even more preferably 8 or more. The upper limit of the number of carbon atoms is not particularly limited and 30 is preferable, 25 is more preferable, and 20 is even more preferable. The alkyl group, or the alkyl group or the like in which at least a portion of the hydrogen atom is substituted with a fluorine atom is preferably a group bonded to a phosphorus atom of a phosphorus-based surface treatment agent, or group in which a hydroxyl group bonded to a phosphorus atom of a phosphorus-based surface treatment agent is etherified thereby. The alkyl group, or the alkyl group or the like in which at least a portion of the hydrogen atom is substituted with a fluorine atom may be either linear or branched, but linear is preferable.

The surface treatment agent is not limited and examples thereof include propylphosphonic acid, butylphosphonic acid, pentylphosphonic acid, octylphosphonic acid, decylphosphonic acid, dodecylphosphonic acid, octadecylphosphonic acid, hexadecylphosphonic acid, undecylphosphonic acid, tridecylphosphonic acid, propyl phosphate, butyl phosphate, pentyl phosphate, octyl phosphate, decyl phosphate, dodecyl phosphate, octadecyl phosphate, hexadecyl phosphate, undecyl phosphate, tridecyl phosphate, and the like.

As hydrophobic phosphorus-based surface treatment agents, it is possible to suitably use fluorine-based phosphorus-based compounds, which are phosphorus compounds having at least one fluorine atom in the molecule, and phosphorus-based compounds having at least one unsubstituted alkyl group in the molecule. In particular, as phosphorus-based compounds, phosphoric acid esters, and phosphorus compounds in which the hydrogen atom bonded to the phosphorus atom of the phosphoric acid is substituted, are preferable.

Due to this, it is possible to further increase the hydrophobicity of the hydrophobic phosphorus-based surface treatment agent in the state of attachment to the metal particles and to provide superior dispersion stability of the metal particles in the water-based composition. In addition, the synergistic effect of being used together with the polyoxyalkylene amine compound is exhibited more conspicuously and it is possible to further improve the storage stability of the water-based composition, the glossiness of the recorded material manufactured using the water-based composition, and the like. In particular, in the recorded material manufactured using the water-based composition, it is possible to more suitably arrange the metal particles near the outer surface of the printed portion and it is possible for the metal material forming the metal particles to more effectively exhibit the inherent characteristics thereof, such as glossiness.

When the hydrophobic phosphorus-based surface treatment agent is a fluorine-based phosphorus-based compound, the fluorine-based phosphorus-based compound preferably has a perfluoroalkyl structure.

Due to this, the storage stability of the water-based composition is superior and it is possible to make the glossiness and abrasion resistance of the printed portion of the recorded material manufactured using the water-based composition superior.

As a silicon-based surface treatment agent, for example, it is possible to use a surface treatment agent or the like prepared by using ammonia water with respect to tetraethoxysilane.

The water-based composition of the present disclosure may include a plurality of compounds as surface treatment agents. In such a case, the same metal particles may be surface treated with a plurality of surface treatment agents. In addition, the water-based composition may also include metal particles which are surface treated with surface treatment agents different from each other as the metal particles.

The surface treatment of the metal particles by the surface treatment agent may be performed, for example, as described above, by including the surface treatment agent in the liquid when the metal particles are formed by pulverizing a metal film formed by a vapor phase deposition method in a liquid.

When surface treatment with a plurality of surface treatment agents is performed with respect to the same particles, the surface treatment may be divided into a plurality of steps corresponding to each surface treatment agent, or the surface treatment may be performed with a plurality of surface treatment agents in the same step.

In addition, the surface treatment with the surface treatment agent may be performed in the same step or in a different step from the treatment with the polyoxyalkylene amine compound. The surface treatment with the surface treatment agent may be performed before the step of treatment with the polyoxyalkylene amine compound or after the step of treatment with the polyoxyalkylene amine compound.

When the content ratio of the polyoxyalkylene amine compound in the water-based composition is XA [% by mass] and the content ratio of the surface treatment agent in the water-based composition is XP [% by mass], the lower limit of the value of XA/XP is preferably 0.02, more preferably 0.05, and even more preferably 0.07. In addition, the upper limit of the value of XA/XP is preferably 3.0, more preferably 2.0, and even more preferably 1.0.

Due to this, it is possible to make the storage stability, water resistance, and the like of the water-based composition superior and to make the glossiness of the recorded material manufactured using the water-based composition superior.

The lower limit of the content ratio of the surface treatment agent in the water-based composition is not particularly limited and is preferably 0.01% by mass, more preferably 0.05% by mass, and even more preferably 0.10% by mass. In addition, the upper limit of the content ratio of the surface treatment agent in the water-based composition is not particularly limited and is preferably 10% by mass, more preferably 7.0% by mass, and even more preferably 5.0% by mass.

Due to this, it is possible to make the storage stability, water resistance, and the like of the water-based composition superior and to make the glossiness of the recorded material manufactured using the water-based composition superior when the water-based composition is stored for a long period of time or stored under severe conditions. In addition, when the water-based composition is an ink jet composition, it is possible to make the ejection stability of the ink jet composition superior, in particular, the ejection stability of the ink jet composition when being stored for a long period of time or being stored under severe conditions superior.

In particular, when the water-based composition is the ink itself to be ejected by the ink jet method, the lower limit of the content ratio of the surface treatment agent in the ink is not particularly limited and is preferably 0.01% by mass, more preferably 0.05% by mass, and even more preferably 0.10% by mass. In addition, when the water-based composition is the ink itself to be ejected by the ink jet method, the upper limit of the content ratio of the surface treatment agent in the ink is not particularly limited and is preferably 1.5% by mass, more preferably 1.0% by mass, and even more preferably 0.8% by mass.

In addition, when the water-based composition is a stock solution used for preparing an ink to be ejected by an ink jet method or a paint, the lower limit of the content ratio of the surface treatment agent in the water-based composition is not particularly limited and is preferably 0.50% by mass, more preferably 0.70% by mass, and even more preferably 1.0% by mass.

In addition, when the water-based composition is a stock solution used for preparing an ink, to be ejected by an ink jet method or a paint, the upper limit of the content ratio of the surface treatment agent in the water-based composition is not particularly limited and is preferably 10% by mass, more preferably 7.0% by mass, and even more preferably 5.0% by mass.

The content of the surface treatment agent in the water-based composition is preferably 5.0 parts by mass or more and 60 parts by mass or less with respect to 100 parts by mass of the metal particles, more preferably 10 parts by mass or more and 50 parts by mass or less, and even more preferably 20 parts by mass or more and 40 parts by mass or less.

Due to this, it is possible to make the storage stability, water resistance, and the like of the water-based composition superior and to make the glossiness of the recorded material manufactured using the water-based composition superior when the water-based composition is stored for a long period of time or stored under severe conditions. In addition, when the water-based composition is an ink jet composition, it is possible to make the ejection stability of the ink jet composition superior, in particular, the ejection stability of the ink jet composition when being stored for a long period of time or when being stored under severe conditions superior.

1-5 Other Components

The water-based composition of the present disclosure may include components other than those described above. Examples of such components include a leveling agent, a binder, a polymerization accelerator, a polymerization inhibitor, a photopolymerization initiator, a dispersing agent, a surfactant, a penetration accelerator, a moisturizer, a coloring agent, a fixing agent, a mold inhibitor, a preservative, an antioxidant, a chelating agent, a thickener, a sensitizer, and the like.

The binder may be a resin and preferable examples thereof include acrylic-based resins, ester-based resins, and urethane-based resins, with acrylic-based resins being more preferable. When a binder is included, it is preferable to include 0.1% by mass or more and 1% by mass or less in the composition, and including 0.5% by mass or less is more preferable.

Preferable examples of surfactants include a silicone-based surfactant, a fluorine-based surfactant, and an acetylene glycol-based surfactant, and the like, and a silicone-based surfactant is particularly preferable. When a surfactant is included in the composition, it is preferable to include 0.1% by mass or more, preferable to include 1% by mass or less, and more preferable to include 0.5% by mass or less.

1-6 Other

The water-based composition of the present disclosure may be used for any application, but applications of the water-based composition include, for example, compositions for coloring, compositions for use in preparing compositions for coloring, and the like.

A composition for coloring is a composition for coloring an object to be colored by attaching the composition to the object to be colored. Examples thereof include inks, paints, and the like. Examples of inks include ink jet inks, without being limited thereto.

The object to be colored is an object which is colored by attaching the composition for coloring thereto. When the composition for coloring is an ink, the object to be colored is a recording medium. For example, the object to be colored is not limited and, in addition to recording media, examples thereof include boards, walls, floors, fences, outside walls, automobiles, other articles, and the like.

The composition used for preparing the composition for coloring is a composition for obtaining the composition for coloring by mixing the composition with other components necessary for the composition for coloring. It is also referred to as a pigment dispersion liquid or pigment dispersion used for the preparation (manufacturing) of a composition for coloring. Therefore, the content of the metal pigment in the composition used to prepare the composition for coloring is greater than the content of the metal pigment in the composition for coloring obtained using the composition used to prepare the composition for coloring.

The upper limit of the viscosity of the water-based composition of the present disclosure at 25° C., as measured in accordance with JIS Z8809 using a rotational viscometer, is not particularly limited, but is preferably 25 mPa·s, and is more preferably 15 mPa·s. In addition, the lower limit of the viscosity of the water-based composition of the present disclosure at 25° C., measured in accordance with JIS Z8809 using a rotational viscometer, is not particularly limited, but is more preferably 1.5 mPa·s.

Due to this, for example, when the water-based composition is an ink to be ejected by an ink jet method, it is possible to more suitably perform the droplet ejection of the ink by the ink jet method.

2 Coloring Method

Next, the coloring method of the present disclosure is described.

The coloring method of the present disclosure is provided with a step of attaching the water-based composition of the present disclosure, which is a composition for coloring, to an object to be colored.

Due to this, it is possible to provide a coloring method able to be applied to the manufacturing of a recorded material having excellent glossiness.

It is possible to perform the step of attaching the water-based composition of the present disclosure to the object to be colored, for example, by various printing methods such as the ink jet method, or by various coating methods using a bar coater, a sprayer, a roll coater, a brush, or the like.

When the composition for coloring is an ink, the coloring method is also a recording method.

The recording medium may be any medium and absorbent or non-absorbent media may be used, for example, paper such as plain paper or special ink jet paper, plastic materials, metals, ceramics, wood, shells, natural and synthetic fibers such as cotton, polyester, and wool, non-woven fabrics, and the like, but non-colored objects are preferable. In addition, the shape of the recording medium is not particularly limited and may be any shape, such as a sheet shape.

When the water-based composition is ejected by an ink jet method, as the ink jet method, it is possible to use a piezo method, a method in which the ink is ejected by bubbles generated by heating the ink, and the like, but the piezo method is preferable from the viewpoint of difficulty in changing the water-based composition and the like.

It is possible to perform the ejection of the water-based composition by the ink jet method using a known droplet ejection device.

3 Recorded Material

Next, a recorded material of the present disclosure is described.

The recorded material of the present disclosure is manufactured by applying the water-based composition as described above onto a recording medium.

Such a recorded material has a printed portion having excellent glossiness and in which the generation of defects is prevented.

The recorded material of the present disclosure may be used for any application, for example, in decorative products or other applications. Specific examples of recorded materials according to the present disclosure include vehicle interior components such as console lids, switch bases, center clusters, interior panels, emblems, center consoles, and meter nameplates, operation portions of various electronic devices, decorative portions which exhibit decorative properties, display parts such as indicators and logos, and the like.

The present disclosure was described above based on suitable embodiments, but the present disclosure is not limited thereto.

EXAMPLES

Next, specific examples of the present disclosure are described.

4 Manufacturing of Water-Based Composition

Example 1

First, a film made of polyethylene terephthalate having a thickness of 20 μm and a smooth surface with a surface roughness Ra of 0.02 μm or less was prepared.

Next, a release layer was formed by coating one entire surface of this film with a mold release resin solubilized by acetone using a roll coater.

The film made of polyethylene terephthalate on which the release layer was formed was transported at a speed of 5 m/s into a vacuum evaporation apparatus and a 17.4 nm thick film formed of Al was formed under reduced pressure.

Next, the film made of polyethylene terephthalate on which the Al film was formed was immersed in tetrahydrofuran and ultrasonic vibrations of 40 kHz were applied thereto to obtain a dispersion liquid of a metal pigment, which was an aggregate of metal particles made of Al.

Next, the tetrahydrofuran was removed by a centrifugal separator and diethylene glycol diethyl ether was added thereto to obtain a suspension with a metal pigment content ratio of 5% by mass.

Next, the suspension was subjected to treatment in a circulating type high-power ultrasonic mill to pulverize the metal particles down to a predetermined size. In this treatment, ultrasonic waves of 20 kHz were applied.

Next, the polyoxyalkylene amine compound represented by Formula (3) was added to the suspension at a proportion such that the mass ratio with respect to the metal particles became the values in the table and a heat treatment was carried out at 55° C. for 1 hour under ultrasonic irradiation at 40 kHz to break the aggregation of the metal particles and disperse the metal particles in a state of primary particles. Here, the polyoxyalkylene amine compound was a block copolymer in which an amino group was bonded to the terminal of continuous oxyethylene units and a methyl group was bonded to the terminals of continuous oxypropylene units, and a polyoxyalkylene amine compound was used in which the weight average molecular weight was 2000 and a condition that, between x1 and x2 in Formula (3), x1/x2 was 3.1 was satisfied.

Furthermore, FHP as a fluorine-based phosphorus-based compound, which is a hydrophobic phosphorus-based surface treatment agent, was added thereto in a proportion such that the mass ratio with respect to the metal particles became the values in the table. FHP is a compound shown as 2-(perfluorohexyl)ethylphosphonic acid: $CF_3(CF_2)_5(CH_2)_2P(O)-(OH)_2$. The FHP was then reacted on the surface of the metal particles by carrying out a heat treatment at 55° C. for 3 hours under 28 kHz ultrasonic irradiation to obtain a dispersion liquid of metal particles with a high leafing capacity and extremely low surface free energy.

The obtained dispersion liquid of the metal particles was subjected to a centrifugation treatment and then the solvent was replaced with a water-based medium to adjust the concentration such that the content ratio of the metal particles was 5% by mass. The mass ratio of the polyoxyalkylene amine compound and hydrophobic phosphorus-based surface treatment agent with respect to the metal particles was adjusted to the values in the table. In this manner, water-based compositions were obtained. The obtained water-based compositions were set as the compositions used for adjusting the composition for coloring. This is also referred to as the pigment dispersion liquid. This pigment dispersion liquid and the remaining components shown in the table were mixed and stirred well to prepare a composition for coloring, and the composition of Example 1, which is a composition for coloring, was obtained.

The volume average particle diameter of the metal particles included in the water-based composition obtained in this manner was 0.49 µm. In addition, the particle diameter D90 of the metal particles included in the water-based composition at 90% of the volume cumulative distribution ratio from the fine particle side was 0.80

Examples 2 to 20

Water-based compositions were manufactured in the same manner as in Example 1 above, except that the metal pigments were formed as shown in Table 1 and Table 2 and the types and ratios of the raw materials contained were changed such that the compositions were as shown in Table 1 and Table 2.

Comparative Examples 1 to 10

Water-based compositions were manufactured in the same manner as in Example 1 above, except that the metal pigments were formed as shown in Table 2 and the types and ratios of raw materials used to prepare the water-based compositions were changed such that the compositions were as shown in Table 2.

In Examples 17 to 20 and Comparative Examples 9 and 10, pigment dispersion liquids were obtained in which the concentration was adjusted such that the content ratio of the metal particles was 10% by mass when the solvent was replaced with a water-based medium.

Then, for Examples 17 and 19 and Comparative Examples 9 and 10, the obtained pigment dispersion liquids were used to prepare a composition for coloring in the same manner as in the other examples to obtain a water-based composition which is a composition for coloring.

In Examples 18 and 20, the water-based composition was obtained when the pigment dispersion liquid was obtained. The water-based compositions may be used as compositions for preparing compositions for coloring or may be used as compositions for coloring as they are.

For each of the Examples and each of the Comparative Examples, the forming of the metal pigment included in the water-based composition and the composition of the water-based composition are summarized in Table 1 and Table 2. In the tables, the polyoxyalkylene amine compound represented by Formula (3) which satisfies the condition that x1/x2 is 3.1 between x1 and x2 and has a weight average molecular weight of 2000 is shown as "POAA1,", the polyoxyalkylene amine compound represented by Formula (3) which satisfies the condition that x1/x2 is 0.11 between x1 and x2 and has a weight average molecular weight of 600 is shown as "POAA2", the polyoxyalkylene amine compound represented by Formula (3) which satisfies the condition that x1/x2 is 6.33 between x1 and x2 and has a weight average molecular weight of 1000 is shown as "POAA3", the polyoxyalkylene amine compound represented by Formula (3) which satisfies the condition that x1/x2 is 7.25 between x1 and x2 and has a weight average molecular weight of 3000 is shown as "POAA4", propylene glycol is shown as "PG", 1,2-hexanediol is shown as "1,2-HD", a hydrophobic phosphorus-based surface treatment agent 2-(perfluorohexyl)ethylphosphonic acid is shown as "FHP", a hydrophobic phosphorus-based surface treatment agent octadecylphosphonic acid is shown as "C18", a hydrophobic phosphorus-based surface treatment agent dodecylphosphonic acid is shown as "C12", a hydrophobic phosphorus-based surface treatment agent octyl phosphonic acid is shown as "C8", a surface treatment agent prepared by using 0.2 parts by mass of 1 mol/L ammonia water with respect to 1 part by mass of tetraethoxysilane is shown as "SiO2", a dispersing agent, Esleam AD-374M (manufactured by NOF Corporation), is shown as "AD-374M", and a dispersing agent, Esleam AD-3172M (manufactured by NOF Corporation), is shown as "AD-3172M". POAA1 to POAA4 were all block copolymers in which an amino group was bonded to the terminal of a continuous oxyethylene unit and a methyl group was bonded to the terminal of a continuous oxypropylene unit. In addition, regarding the metal pigments forming the water-based compositions of each of the Examples, observations were made of 50 arbitrary metal particles, respectively. As a result, the ratio $S_1/S_0$ of the area $S_1$ [μm$^2$] when observed from the direction in which the projected area is the largest, that is, in plan view, and the area $S_0$ [m$^2$] when observed from the direction in which the area is the largest when observed in a direction orthogonal to the former observation direction was determined, the average value thereof was determined, and, at that time, the average values of $S_1/S_0$ were all 19 or more. The volume average particle diameters D50 and D90 in the table were measured using a Microtrac MT-3300 (laser diffraction and scattering particle size analyzer manufactured by MicrotracBEL Corp.). In addition, the viscosities of the water-based compositions of the Examples 1 to 16 at 25° C., measured in accordance with JIS Z8809 using a rotational viscometer, were all values in a range of 1.5 mPa·s or more and 15 mPa·s or less.

TABLE 1

| | METAL PIGMENT | | | | | POLYOXYALKYLENE AMINE COMPOUND | | | |
|---|---|---|---|---|---|---|---|---|---|
| | | THICKNESS | D50 | D90 | CONTENT | CONTENT [PARTS BY MASS] | | | |
| | COMPOSITION | [nm] | [μm] | [μm] | [PARTS BY MASS] | POAA1 | POAA2 | POAA3 | POAA4 |
| EXAMPLE 1 | Al | 17.4 | 0.49 | 0.80 | 1.2 | 0.06 | — | — | — |
| EXAMPLE 2 | Al | 17.4 | 0.49 | 0.80 | 1.2 | — | 0.06 | — | — |
| EXAMPLE 3 | Al | 17.4 | 0.49 | 0.80 | 1.2 | — | — | 0.06 | — |
| EXAMPLE 4 | Al | 17.4 | 0.49 | 0.80 | 1.2 | — | — | — | 0.06 |
| EXAMPLE 5 | Al | 17.4 | 0.49 | 0.80 | 1.2 | 0.0012 | — | — | — |
| EXAMPLE 6 | Al | 17.4 | 0.49 | 0.80 | 1.2 | 0.012 | — | — | — |
| EXAMPLE 7 | Al | 17.4 | 0.49 | 0.80 | 1.2 | 0.12 | — | — | — |
| EXAMPLE 8 | Al | 17.4 | 0.49 | 0.80 | 1.2 | 0.36 | — | — | — |
| EXAMPLE 9 | Al | 17.4 | 0.39 | 0.80 | 1.2 | 0.06 | — | — | — |
| EXAMPLE 10 | Al | 17.4 | 0.78 | 0.80 | 1.2 | 0.06 | — | — | — |
| EXAMPLE 11 | Al | 14.5 | 0.47 | 0.80 | 1.2 | 0.06 | — | — | — |
| EXAMPLE 12 | Al | 20.0 | 0.49 | 0.80 | 1.2 | 0.06 | — | — | — |
| EXAMPLE 13 | Al | 17.4 | 0.49 | 0.80 | 1.2 | 0.06 | — | — | — |
| EXAMPLE 14 | Al | 17.4 | 0.49 | 0.80 | 1.2 | 0.06 | — | — | — |
| EXAMPLE 15 | Al | 17.4 | 0.39 | 0.80 | 1.2 | 0.06 | — | — | — |

| | WATER-BASED MEDIUM CONTENT [PARTS BY MASS] | | | SURFACE TREATMENT AGENT CONTENT [PARTS BY MASS] | | | | OTHER COMPONENTS CONTENT [PARTS BY MASS] | |
|---|---|---|---|---|---|---|---|---|---|
| | WATER | PG | 1,2-HD | FHP | C18 | C12 | C8 | SiO2 | AD-374M | AD-3172M |
| EXAMPLE 1 | 58.38 | 20.0 | 20.0 | 0.4 | — | — | — | — | — | — |
| EXAMPLE 2 | 58.38 | 20.0 | 20.0 | 0.4 | — | — | — | — | — | — |
| EXAMPLE 3 | 58.38 | 20.0 | 20.0 | 0.4 | — | — | — | — | — | — |
| EXAMPLE 4 | 58.38 | 20.0 | 20.0 | 0.4 | — | — | — | — | — | — |
| EXAMPLE 5 | 58.44 | 20.0 | 20.0 | 0.4 | — | — | — | — | — | — |
| EXAMPLE 6 | 58.43 | 20.0 | 20.0 | 0.4 | — | — | — | — | — | — |
| EXAMPLE 7 | 58.32 | 20.0 | 20.0 | 0.4 | — | — | — | — | — | — |
| EXAMPLE 8 | 58.08 | 20.0 | 20.0 | 0.4 | — | — | — | — | — | — |
| EXAMPLE 9 | 58.38 | 20.0 | 20.0 | 0.4 | — | — | — | — | — | — |
| EXAMPLE 10 | 58.38 | 20.0 | 20.0 | 0.4 | — | — | — | — | — | — |
| EXAMPLE 11 | 58.38 | 20.0 | 20.0 | 0.4 | — | — | — | — | — | — |
| EXAMPLE 12 | 58.38 | 20.0 | 20.0 | 0.4 | — | — | — | — | — | — |
| EXAMPLE 13 | 58.38 | 20.0 | 20.0 | — | — | — | — | 0.4 | — | — |
| EXAMPLE 14 | 58.38 | 20.0 | 20.0 | — | 0.4 | — | — | — | — | — |
| EXAMPLE 15 | 58.38 | 20.0 | 20.0 | — | — | 0.4 | — | — | — | — |

TABLE 2

| | METAL PIGMENT | | | | | POLYOXYALKYLENE AMINE COMPOUND | | | |
|---|---|---|---|---|---|---|---|---|---|
| | | THICKNESS | D50 | D90 | CONTENT | CONTENT [PARTS BY MASS] | | | |
| | COMPOSITION | [nm] | [μm] | [μm] | [PARTS BY MASS] | POAA1 | POAA2 | POAA3 | POAA4 |
| EXAMPLE 16 | Al | 17.4 | 0.39 | 0.80 | 1.2 | 0.06 | — | — | — |
| EXAMPLE 17 | Al | 17.4 | 0.49 | 0.80 | 5.0 | 0.25 | — | — | — |
| EXAMPLE 18 | Al | 17.4 | 0.49 | 0.80 | 10.0 | 0.50 | — | — | — |
| EXAMPLE 19 | Al | 17.4 | 0.39 | 0.80 | 5.0 | 0.06 | — | — | — |
| EXAMPLE 20 | Al | 17.4 | 0.39 | 0.80 | 10.0 | 0.06 | — | — | — |
| COMPARATIVE EXAMPLE 1 | Al | 17.4 | 0.49 | 0.80 | 1.2 | — | — | — | — |
| COMPARATIVE EXAMPLE 2 | Al | 17.4 | 0.49 | 0.80 | 1.2 | — | — | — | — |
| COMPARATIVE EXAMPLE 3 | Al | 17.4 | 0.49 | 0.80 | 1.2 | — | — | — | — |

TABLE 2-continued

| | | | | | | | | | |
|---|---|---|---|---|---|---|---|---|---|
| COMPARATIVE EXAMPLE 4 | Al | 17.4 | 0.49 | 0.80 | 1.2 | 0.00012 | — | — | — |
| COMPARATIVE EXAMPLE 5 | Al | 17.4 | 0.49 | 0.80 | 1.2 | 1.2 | — | — | — |
| COMPARATIVE EXAMPLE 6 | Al | 17.4 | 0.49 | 0.80 | 1.2 | — | — | — | — |
| COMPARATIVE EXAMPLE 7 | Al | 17.4 | 0.49 | 0.80 | 1.2 | 0.06 | — | — | — |
| COMPARATIVE EXAMPLE 8 | Al | 17.4 | 0.49 | 0.80 | 1.2 | — | — | — | — |
| COMPARATIVE EXAMPLE 9 | Al | 17.4 | 0.39 | 0.80 | 5.0 | — | — | — | — |
| COMPARATIVE EXAMPLE 10 | Al | 17.4 | 0.39 | 0.80 | 5.0 | 0.25 | — | — | — |

| | WATER-BASED MEDIUM CONTENT [PARTS BY MASS] | | | SURFACE TREATMENT AGENT CONTENT [PARTS BY MASS] | | | | | OTHER COMPONENTS CONTENT [PARTS BY MASS] | |
|---|---|---|---|---|---|---|---|---|---|---|
| | WATER | PG | 1,2-HD | FHP | C18 | C12 | C8 | SiO2 | AD-374M | AD-3172M |
| EXAMPLE 16 | 58.38 | 20.0 | 20.0 | — | — | — | — | 0.4 | — | — |
| EXAMPLE 17 | 54.75 | 20.0 | 20.0 | 1.5 | — | — | — | — | — | — |
| EXAMPLE 18 | 49.50 | 20.0 | 20.0 | 3.0 | — | — | — | — | — | — |
| EXAMPLE 19 | 54.94 | 20.0 | 20.0 | — | 1.5 | — | — | — | — | — |
| EXAMPLE 20 | 49.94 | 20.0 | 20.0 | — | 3.0 | — | — | — | — | — |
| COMPARATIVE EXAMPLE 1 | 58.38 | 20.0 | 20.0 | 0.4 | — | — | — | — | — | — |
| COMPARATIVE EXAMPLE 2 | 58.38 | 20.0 | 20.0 | 0.4 | — | — | — | — | 0.06 | — |
| COMPARATIVE EXAMPLE 3 | 58.38 | 20.0 | 20.0 | 0.4 | — | — | — | — | — | 0.06 |
| COMPARATIVE EXAMPLE 4 | 58.44 | 20.0 | 20.0 | 0.4 | — | — | — | — | — | — |
| COMPARATIVE EXAMPLE 5 | 57.24 | 20.0 | 20.0 | 0.4 | — | — | — | — | — | — |
| COMPARATIVE EXAMPLE 6 | 58.44 | 20.0 | 20.0 | 0.4 | — | — | — | — | — | — |
| COMPARATIVE EXAMPLE 7 | 58.74 | 20.0 | 20.0 | — | — | — | — | — | — | — |
| COMPARATIVE EXAMPLE 8 | 58.80 | 20.0 | 20.0 | — | — | — | — | — | — | — |
| COMPARATIVE EXAMPLE 9 | 55.00 | 20.0 | 20.0 | 1.5 | — | — | — | — | — | — |
| COMPARATIVE EXAMPLE 10 | 54.75 | 20.0 | 20.0 | — | — | — | — | — | — | — |

5 Evaluation 5-1 Dispersibility of Metal Particles

For each of the Examples and Comparative Examples, in the process of manufacturing each water-based composition, in a step of carrying out a heat treatment on the metal particles at 55° C. for 1 hour under ultrasonic irradiation at 40 kHz, the polyoxyalkylene amine compound was not used and Esleam AD-374M (manufactured by NOF Corporation) was used instead at a mass ratio of 5% by mass with respect to 100% by mass of the metal particles and the heat treatment was performed in the same manner.

Here, Esleam AD-374M is a dispersing agent which exhibits good dispersibility in non-water-based media.

After the heat treatment, the obtained liquid was kept as it was and the volume average particle diameter D50 of the metal particles included in the dispersion liquid was measured. With the volume average particle diameter D50 of the metal particles included in this liquid as a reference value, the volume average particle diameters D50 of the metal particles included in the water-based compositions finally obtained in each Example and each Comparative Example were also measured and compared.

The measurements were performed using a Microtrac MT-3300 (laser diffraction and scattering particle size analyzer manufactured by MicrotracBEL Corp.).

The dispersibility of the metal particles was evaluated according to the following criteria. The smaller the ratio of the volume average particle diameter D50 of the metal particles included in the water-based composition with respect to the above reference value, the better the dispersibility of the metal particles. B or higher was a good level.

A: The ratio D50 of the metal particles included in the water-based composition with respect to the reference value is less than 110%.

B: The ratio D50 of the metal particles included in the water-based composition with respect to the reference value is 110% or more and less than 150%.

C: The ratio D50 of the metal particles included in the water-based composition with respect to the reference value is 150% or more and less than 200%.

D: The ratio D50 of the metal particles included in the water-based composition with respect to the reference value is 200% or more and less than 500%.

E: The ratio D50 of the metal particles included in the water-based composition with respect to the reference value is 500% or more.

5-2 Water Resistance

The water-based compositions of each Example and each Comparative Example were sealed in a pack and left in a thermostatic bath at 70° C. for 6 days, the amount of gas generated per unit mass of the water-based composition was determined, and the water resistance was evaluated according to the following criteria. The lower the amount of gas generated, the better the water resistance. B or higher was a good level.

A: The amount of gas generated is less than 0.2 ml/g.
B: The amount of gas generated is 0.2 mL/g or more and less than 0.4 mL/g.
C: The amount of gas generated is 0.4 mL/g or more and less than 1.0 mL/g.
D: The amount of gas generated is 1.0 mL/g or more and less than 5.0 mL/g.
E: The amount of gas generated is 5.0 mL/g or more.

5-3 Gloss

First, using the water-based compositions of each of the Examples and Comparative Examples respectively, recorded materials were manufactured as follows.

That is, for the water-based compositions of the Examples 1 to 16 and Comparative Examples 1 to 8, the water-based compositions were attached to a 2-mm-thick polycarbonate plate as a recording medium by performing droplet ejection using an ink jet printer (SC-580650, manufactured by Seiko Epson) such that the attachment amount of the solid content of the water-based compositions to the plate was 8 mg/inch², thereby obtaining recorded materials.

In addition, for the water-based compositions of the Examples 17 to 20 and Comparative Examples 9 and 10, the water-based compositions were attached to a 2-mm-thick polycarbonate plate as a recording medium by a bar coater such that the attachment amount of the solid content of the water-based compositions was 8 mg/inch², thereby obtaining recorded materials.

The degree of gloss of the printed portions of the recorded materials for each Example and each Comparative Example obtained as described above was measured at a fanning angle of 60° using a gloss meter, Minolta Multi Gloss 268, and evaluated according to the following criteria. The higher this value is, the better the gloss property is. B or higher was a good level.

A: Degree of gloss is 400 or higher.
B: Degree of gloss is 350 or higher and less than 400.
C: Degree of gloss is 300 or higher and less than 350.
D: Degree of gloss is 250 or higher and less than 300.
E: Degree of gloss is less than 250.

5-4 Ejection Stability

A droplet ejection apparatus installed in a thermal chamber was prepared and droplet ejection was performed from all nozzles of a droplet ejection head with a nozzle hole size of 22 μm in diameter for each water-based composition of Examples 1 to 16 and Comparative Examples 1 to 8 in an environment of 25° C. and 50% RH in a state where the driving waveform of the piezoelectric element was optimized, while changing the frequency of the piezoelectric element. The droplet ejection time at each frequency was set to 1 minute. As the highest frequency for practical use, a frequency up to the point at which the number of non-ejecting nozzles at the time after 1 minute of ejection was less than 0.5% of the total number of nozzles and the number of nozzles exhibiting abnormalities such as delayed or bent ejection was less than 5% of the total number of nozzles was set and the ejection stability was evaluated in the practical use frequency range in accordance with the four stage criteria below. The higher this value is, the better the frequency characteristics are. B or higher was a good level.

A: 11 kHz or higher.
B: 5 kHz or higher and less than 11 kHz.
C: 3 kHz or higher and less than 5 kHz.
D: Less than 3 kHz.

These results are shown in Table 3 and Table 4.

TABLE 3

| | DISPERS-IBILITY | WATER RESISTANCE | GLOSS | EJECTION STABILITY |
|---|---|---|---|---|
| EXAMPLE 1 | A | A | A | A |
| EXAMPLE 2 | B | A | B | C |
| EXAMPLE 3 | B | A | A | B |
| EXAMPLE 4 | A | B | A | A |
| EXAMPLE 5 | B | A | B | C |
| EXAMPLE 6 | B | A | B | B |
| EXAMPLE 7 | A | A | A | A |
| EXAMPLE 8 | A | B | A | B |
| EXAMPLE 9 | A | A | B | A |
| EXAMPLE 10 | B | A | A | C |
| EXAMPLE 11 | A | B | A | A |
| EXAMPLE 12 | A | A | B | B |
| EXAMPLE 13 | B | B | B | D |
| EXAMPLE 14 | A | A | A | A |
| EXAMPLE 15 | A | B | B | A |

TABLE 4

| | DISPERS-IBILITY | WATER RESISTANCE | GLOSS | EJECTION STABILITY |
|---|---|---|---|---|
| EXAMPLE 16 | B | B | B | B |
| EXAMPLE 17 | A | B | A | — |
| EXAMPLE 18 | B | B | B | — |
| EXAMPLE 19 | A | B | A | — |
| EXAMPLE 20 | B | B | B | — |
| COMPARATIVE EXAMPLE 1 | B | B | C | D |
| COMPARATIVE EXAMPLE 2 | B | C | C | C |
| COMPARATIVE EXAMPLE 3 | A | B | C | C |
| COMPARATIVE EXAMPLE 4 | C | B | B | D |
| COMPARATIVE EXAMPLE 5 | A | C | B | B |
| COMPARATIVE EXAMPLE 6 | D | B | B | D |
| COMPARATIVE EXAMPLE 7 | B | D | E | D |
| COMPARATIVE EXAMPLE 8 | E | D | E | D |
| COMPARATIVE EXAMPLE 9 | D | D | C | — |
| COMPARATIVE EXAMPLE 10 | B | D | E | — |

As shown in Tables 3 and 4, the water-based compositions of the present disclosure had excellent water resistance and dispersion stability of the metal particles and were able to be suitably applied to the manufacturing of a recorded material with excellent glossiness. In contrast, it was not possible to obtain satisfactory results in the Comparative Examples. It was possible to suitably use the water-based compositions of Examples 17 to 20 for the preparation of ink jet inks through dilution with a water-based medium.

What is claimed is:

1. A water-based composition comprising:
a metal pigment;
a polyoxyalkylene amine compound; and
a water-based medium, wherein
the metal pigment is formed of a plurality of metal particles,
the metal particles are surface-modified by a surface treatment agent that includes a hydrophobic phosphorous-based surface treatment agent, and
a content of the polyoxyalkylene amine compound is 0.1 parts by mass or more and 50 parts by mass or less with respect to 100 parts by mass of the metal particles.

2. The water-based composition according to claim 1, wherein the polyoxyalkylene amine compound is at least one of a compound represented by Formula (1) and a salt thereof $$(R^1-(O-R^2)_X)_Y-NH_{(3-Y)} \quad (1)$$

(in Formula (1), $R^1$ is a hydrogen atom or an alkyl group having four or fewer carbon atoms, $R^2$ is an alkylene group having five or fewer carbon atoms, and X is an integer of 10 or more, in addition, in Formula (1), a plurality of oxyalkylene units with different conditions of $R^2$ are optionally provided, Y is an integer of 1 to 3, and, when Y is two or more, $(R^1-(O-R^2)_X)$ units with different conditions of $R^1$, $R^2$, and X may be included).

3. The water-based composition according to claim 2, wherein
the polyoxyalkylene amine compound is at least one of a compound represented by Formula (2) and a salt thereof

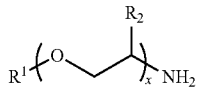  (2)

(in Formula (2), $R^1$ is a hydrogen atom or an alkyl group having four or fewer carbon atoms, $R^2$ is a hydrogen atom or an alkyl group having three or fewer carbon atoms, and X is an integer of 10 or more, in addition, in Formula (2), a plurality of oxyalkylene units with different conditions of R are optionally provided).

4. The water-based composition according to claim 1, wherein
the metal particles are formed of aluminum or an aluminum alloy.

5. The water-based composition according to claim 1, wherein
a volume average particle diameter of the metal particles is 0.20 μm or more and 1.00 μm or less.

6. The water-based composition according to claim 1, wherein
the metal particles are scale-shaped.

7. The water-based composition according to claim 6, wherein
an average thickness of the metal particles is 10 nm or more and 90 nm or less.

8. The water-based composition according to claim 1, wherein
the hydrophobic phosphorous-based surface treatment agent includes an alkyl group having three or more carbon atoms.

9. The water-based composition according to claim 1, wherein
a weight average molecular weight of the polyoxyalkylene amine compound is 400 or more and 8000 or less.

10. The water-based composition according to claim 1, wherein
the content of the polyoxyalkylene amine compound is 0.1 parts by mass or more and 30 parts by mass or less with respect to 100 parts by mass of the metal particles.

11. The water-based composition according to claim 1, wherein the water-based composition is a composition for coloring, or a composition for use in preparing a composition for coloring.

12. A coloring method comprising:
attaching the water-based composition according to claim 1, which is a composition for coloring, to an object to be colored.

* * * * *